United States Patent [19]

Tasse

[11] Patent Number: 4,930,205

[45] Date of Patent: Jun. 5, 1990

[54] METHOD OF SECURING PLASTIC ROLL TO METAL CORE ROLLER

[76] Inventor: Yvon Tasse, St.-Pascal Baylon, Ontario, Canada, K0A 3N0

[21] Appl. No.: 299,605

[22] Filed: Jan. 23, 1989

[30] Foreign Application Priority Data

Jan. 28, 1988 [CA] Canada .................................. 557598

[51] Int. Cl.⁵ ............................................. B23P 11/02
[52] U.S. Cl. ...................................... 29/450; 29/447; 29/895.212
[58] Field of Search ..................... 29/447, 450, 148.40, 29/402.01

[56] References Cited

U.S. PATENT DOCUMENTS

| | | | |
|---|---|---|---|
| 4,662,045 | 5/1987 | Grödum | 29/148.4 D |
| 4,685,184 | 8/1987 | Satkamp | 29/447 |
| 4,727,641 | 3/1988 | Kanatani et al. | 29/447 |
| 4,793,042 | 12/1988 | Easter | 29/148.4 D |

Primary Examiner—Howard N. Goldberg
Assistant Examiner—I. Cuda
Attorney, Agent, or Firm—Burke-Robertson

[57] ABSTRACT

A method of making hard rollers for commercial printing presses comprising the sequential steps of heating a cylindrical sleeve of plastic material until it reaches an elastic state, fitting the sleeve into position over a cylindrical metal core having an outer diameter slightly greater than the inner diameter of the cylindrical sleeve, and cooling the cylindrical sleeve. The method may be used to rebuild worn rollers and is simpler and more versatile than conventional methods of making hard rollers including electrostatic spraying of metal cores or securing plastic sleeves by means of adhesive or heating heat shrinkable polymer sleeves.

7 Claims, No Drawings

METHOD OF SECURING PLASTIC ROLL TO METAL CORE ROLLER

The present invention relates to a method of making hard rollers for commercial printing presses. This method may be used to build new rollers or to rebuild used, worn rollers.

BACKGROUND OF THE INVENTION

Conventionally "hard" rollers for commercial printing presses have consisted of cylindrical metal cores over which are secured plastic sleeves for example of polyethylene or Nylon (trade mark). Such rollers are conventionally made at the present time by various processes including the heating of the metal core and the placing of that core in a fluid bath of powdered plastic (e.g. Nylon or polyethylene), or by electrostatic spraying of the plastic material onto the metal core. The plastic coating is then machined to ensure proper symmetry thereof and proper size (outer diameter). The achievable thickness of the plastic sleeve is limited when using the fluid bath coating process. Both the fluid bath coating and electrostatic spray processes require relatively expensive apparatus.

Securing the plastic sleeve in place on the metal core by means of an adhesive substance is not a preferred process for making hard rollers, since conventional adhesives used in this process have a tendency to loosen under the rigorous conditions of usage of such hard rollers.

U.S. Pat. No. 4,198,739 of Dudinger et al issued Apr. 22, 1980 is representative of a process of securing such a plastic sleeve to a metal core by means of an adhesive.

U.S. Pat. Nos. 4,250,605 and 4,325,998, both of Chapman, issued respectively Feb. 17, 1981 and Apr. 20, 1982, describe and illustrate a method for providing a polymer sleeve for a process roller, which method uses a biaxially heat shrinkable sleeve, for example made of polyvinyl chloride. The sleeve is placed over a cylinder into a tight fitting relationship and then heat is applied to the sleeve to shrink it into secured position on the cylinder. This process requires usage of either a normally biaxially heat shrinkable polymer or, in the case of polyvinyl chloride, pretreating the polyvinyl chloride by biaxially expanding it in both radial and axial directions beyond its room temperature elastic limits. Such biaxially heat shrinkable polymers are relatively expensive and consequently may be impractical for general use in making hard rollers for commercial printing presses.

It is an object of the present invention to provide a simple, inexpensive method of making such hard rollers, using conventional polymer materials.

DESCRIPTION OF THE INVENTION

In accordance with the present invention a method of making hard rollers for commercial printing presses is provided, comprising the sequential steps of heating a cylindrical sleeve of plastic material to a temperature high enough to produce a sufficiently elastic state in the material to enable it to be stretched a cylindrical metal core having an outer diameter of between 5% to 20% greater than the inner diameter of the cylindrical sleeve at normal temperatures of sleeve and core, stretching the sleeve while thus heated into position over the core, and cooling the cylindrical sleeve whereby the cooled sleeve will shrink to further secure it in position on the core.

In a preferred embodiment of the method according to the present invention, the sleeve is made of unplasticized polyvinyl chloride and the sleeve and core are heated to about 350° F. before the sleeve is fitted into position over the core.

The method of the present invention has several advantages over the previously described conventional methods of making hard rollers. First of all, conventional polymers which are not heat shrinkable, are used, with consequent cost savings. The hard rollers produced according to the present invention have been found to be surprisingly durable, the sleeves remaining secured in position on the rollers during normal usage over long periods of time. As well, relatively simple, inexpensive, conventional apparatus may be used to carry out the method of this invention.

In carrying out the present invention, the core will have an outer diameter which is normally between 5% to 20% greater than the inner diameter of the sleeve. This will permit the sleeve, when heated to its elastic state, to expand sufficiently to receive the core. Where the outer diameter of the core is significantly greater than the inner diameter of the sleeve, it may be necessary to place a removable conical cap on one end of the core to facilitate expansion of the sleeve as the sleeve is placed over the core at that end (e.g. where the outer diameter of the core is between 17% to 20% greater than the inner diameter of the sleeve).

While the plastic material is preferably polyvinyl chloride, other plastic materials such as polyethylene may be used. Rollers of up to 52 inches in length and greater may be made according to the present invention. If necessary, after the sleeve is placed on the core and cooled, the sleeve may be machined for example on a lathe, to ensure that it is properly symmetrical and has a proper outer diameter.

Where the outer diameter of the core is not much greater than the inner diameter of the sleeve (e.g. 1/25,000th of an inch interference or less, interference being the amount by which the outer diameter of the core is greater than the inner diameter of the sleeve), it may be unnecessary to heat the metal core. As well, the method according to the present invention, for nominal core and sleeve sizes (e.g. 1 inch to 8 inches) may be effective where the interference is as little as 1/10,000th of an inch.

EXAMPLE 1

A 40 inch long cylindrical copper core of 3.237 inch outer diameter and a polyvinyl chloride tube of similar length having an inner diameter of 3.049 inches and a outer diameter of 3.315 inches were both heated to 350° F. At this temperature the polyvinyl chloride tube was in an elastic state. The core was inserted into the tube, from one end, by forcing the tube and thereby expanding the polyvinyl chloride sleeve, until the sleeve was seated fully over the core. The core and sleeve were then permitted to cool to room temperature.

The roller thus prepared was then machined on a lathe to a uniform outer diameter of 3.485 inches. This roller was then ready for use in a conventional commercial printing press.

The process according to the present invention is particularly useful in reconditioning used or worn commercial printing press rollers, in that the worn plastic sleeve may be readily removed from the metal core, which core is still in good condition for reuse. The core may then be recovered with a new cylindrical sleeve of proper dimensions in accordance with the present invention.

Thus there has been provided in accordance with the invention a method of making hard rollers for commercial printing presses that fully satisfies the objects, aims and advantages set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. A method of making hard rollers for commercial printing presses, comprising the sequential steps of:
   (a) heating a cylindrical sleeve of plastic material to a temperature high enough to produce a sufficient elastic state in the material to enable it to be stretched over a cylindrical metal core having an outer diameter of between 5% to 20% greater than the inner diameter of the cylindrical sleeve at normal temperatures of the sleeve and core;
   (b) stretching the sleeve while thus heated into position over the cylindrical metal core; and
   (c) cooling the cylindrical sleeve,
   whereby the cooled sleeve will shrink to further secure it in position on the core.

2. A method according to claim 1 comprising heating the sleeve to about 350° F. before stretching the sleeve into position over the core.

3. A method according to claim 2 wherein the sleeve material is unplasticized PVC.

4. A method according to claim 1, wherein the sleeve and core are of similar length.

5. A method according to claim 1 wherein the length of the sleeve and roller are no more than fifty-two inches.

6. A method according to claim 1 wherein the length of the sleeve and roller are up to about 52 inches.

7. A method according to claim 1 the outer core diameter and the inner sleeve diameter are in the range of 1 inch to 8 inches.

* * * * *